Figure 1:
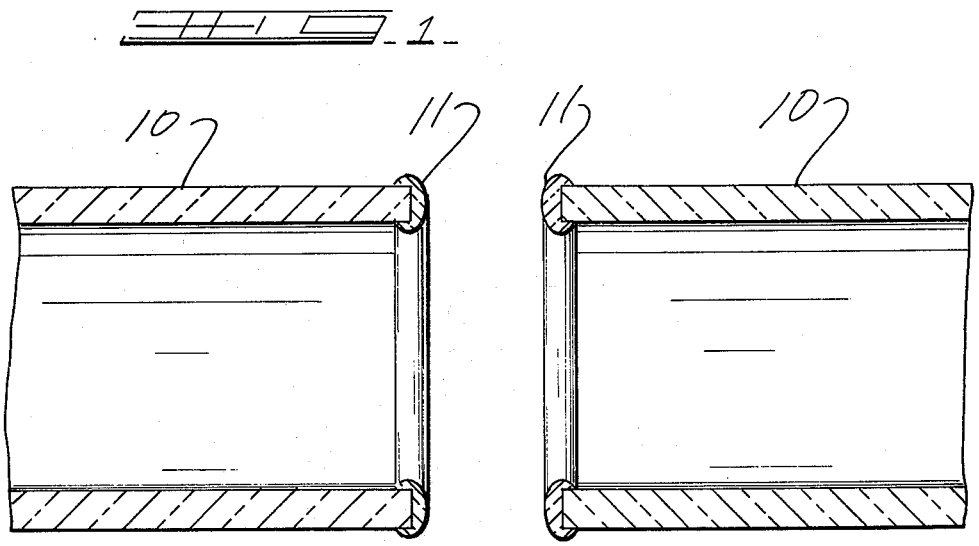

United States Patent [19]

Pirooz

[11] 3,906,147

[45] Sept. 16, 1975

[54] VITREOUS SEALS FOR GLASS ELECTRICAL CONDUITS

[75] Inventor: Perry P. Pirooz, Toledo, Ohio

[73] Assignee: Owens-Illinois, Inc., Toledo, Ohio

[22] Filed: Nov. 14, 1973

[21] Appl. No.: 415,738

[52] U.S. Cl. ............... 174/84 R; 174/68 C; 106/53; 106/54; 138/177; 285/285; 285/DIG. 12
[51] Int. Cl.$^2$ ........................................ H02G 15/08
[58] Field of Search .... 174/84 R, 68 R, 68 C, 68 A, 174/96; 138/177; 106/53, 54; 285/285, DIG. 12

[56] References Cited
UNITED STATES PATENTS

| | | | |
|---|---|---|---|
| 3,088,833 | 5/1963 | Pirooz | 106/54 X |
| 3,088,834 | 5/1963 | Pirooz | 106/54 X |
| 3,752,701 | 8/1973 | Morrissey | 106/53 X |

*Primary Examiner*—Darrell L. Clay
*Attorney, Agent, or Firm*—Howard G. Bruss, Jr.; E. J. Holler

[57] ABSTRACT

Disclosed are alkali-free, zinc-lead-borate sealing glass compositions having the following electrical properties at 150°C, a log AC resistivity (ohm-cm) ≥ 10 of a dielectric constant (K) of ≤ 10 and a K tan$\delta$ ≤ 0.1 which form vitreous, hermetic seals between tubular alkaline earth aluminoborosilicate glass conduit sections for containing and electrically insulating an underground power transmission network.

8 Claims, 2 Drawing Figures

VITREOUS SEALS FOR GLASS ELECTRICAL CONDUITS

This application is related to commonly assigned copending applications Ser. No. 415,739 filed 11-14-73 entitled "Glass Conduit for Electrical Conductors", Ser. No. 415,737 filed 11-14-73 entitled "Semiconducting Coating for Glass Conduits" now U.S. Pat. 3,856,979, Ser. No. 415,919 filed 11-14-73 entitled "An Electric Power Transmission Line", the disclosures of which are incorporated by reference.

This invention relates to the sealing of a plurality of tubular glass conduit sections to form a continuous glass conduit for containing electrical power conductors. More particularly, this invention pertains to the formation of substantially vitreous seals which have thermal expansion characteristics compatible with glass conduits having a thermal expansion coefficient in the range of 30 to 70 × $10^{-7}$ (0°–300°C)/°C in addition to good dielectric breakdown strength and low dielectric loss characteristics. The present invention is particularly advantageous in joining glass conduit sections of the type disclosed in commonly assigned copending application Ser. No. 415,739 filed 11-14-73 the disclosure of which is incorporated by reference.

The joining of glass conduit sections in axial alignment, particularly glass-to-glass joining with a sealing glass, involves the use of rather high temperatures in order for the glass conduits to be hermetically fused to one another. The use of such high temperatures also generates other conditions detrimental to the glass conduit such as deformation or the introduction of permanent stress which may at some later time result in failure either spontaneously or under the influence of electrical or mechanical stress.

To reduce the susceptibility of the seal to such mechanical or electrical failure, the achievement of several electrical and physical properties in the seal is essential. First of all, the sealing glass must soften and seal the conduit glass section below the temperature at which the glass conduit will distort. Additionally, the sealing glass must have high electrical resistivity at the elevated temperatures that may be encountered in operation. For this reason, the log of the AC resistivity in ohm-cm should be $\geq 10$ at 150°C at 50Hz. The sealing glass must also have a low dielectric loss factor so that dielectric heating and attendant risk of seal failure is minimized. For this reason, the dielectric constant (K) should be $\leq 10$ at 150°C and 50Hz and the dissipation factor (tan$\delta$) at 150°C and 50Hz should be such that the product of K tan$\delta$ is $\leq 0.1$. Furthermore, the seal must be substantially vitreous and substantially free from other phase separations in the form of amorphous decomposition or seeds, blisters, and other gaseous inclusion which might provide grain boundaries or other discontinuities which would function as an electrical path for dielectric failure. Finally the glass seal must be mechanically compatible with the glass conduit so that the seal is substantially free of mechanical stress or have a slight compressive stress of less than about 1000 psi compression.

In attaining the foregoing objects, one feature resides sealing tubular glass conduit sections in axial alignment with substantially alkali metal oxide free sealing glass compositions consisting essentially of the following components in the following weight percentages:

| | |
|---|---|
| ZnO | 35–60 |
| $B_2O_3$ | 20–35 |
| PbO | 5–20 |
| $Al_2O_3$ | 1–10 |
| $SiO_2$ | 1–10 | said sealing glass having the following electrical properties at 150°C and 50 Hz, log AC resistivity (ohm-cm) $\geq 10$, dielectric constant (K) of $\leq 10$ and a K tan$\delta \leq 0.1$.

Preferably the sealing glass composition consists essentially of:

| | |
|---|---|
| ZnO | 45–57 |
| $B_2O_3$ | 25–35 |
| PbO | 5–15 |
| $Al_2O_3$ | 3–6 |
| $SiO_2$ | 3–8 |

The foregoing sealing glass composition ranges have coefficients of thermal expansion in the range of about 40 to about 60 × $10^{-7}$ (0°–300°C)/°C. The foregoing sealing glass compositions form vitreous seals when fused in the temperature range of about 650°C to about 800°C for a time period ranging from about 5 minutes to about 2 hours with the higher temperature requiring the shorter time. Preferably, the seals are formed by heating for a time period ranging from about 15 minutes to one hour to prevent devitrification. These temperature conditions assure the formation of a vitreous seal which are resistant to devitrification and other forms of phase separations.

In a preferred practice, the glass conduits are of the type described in Ser. No. 415,739 filed 11-14-73 having a coefficient of thermal expansion in the range of 30 to 70 × $10^{-7}$ (0–300)°C/°C. Such tubular glass conduits have alkali free compositions consisting essentially of the following components in weight percent:

| OXIDE | BROAD | PREFERRED | MORE PREFERRED |
|---|---|---|---|
| $SiO_2$ | 28–60 | 30–60 | 35–60 |
| $B_2O_3$ | 5–25 | 5–24 | 5–23 |
| $Al_2O_3$ | 13–35 | 14–25 | 14–22 |
| CaO | 0–30 | 5–20 | 5–20 |
| MgO | 0–30 | 5–20 | 5–20 |
| Wherein: | | | |
| CaO+MgO | 10–30 | 11–28 | 15–25 |
| $SiO_2+B_2O_3$ | $\leq$ 75 | $\leq$ 70 | $\leq$ 65 |
| $SiO_2+Al_2O_3$ | $\leq$ 75 | $\leq$ 70 | $\leq$ 65 |
| $Al_2O_3+CaO+MgO$ | $\leq$ 60 | $\leq$ 55 | $\leq$ 45 |

Each of the components in the sealing glass composition contribute a vital function in fulfilling the aforementioned-performance characteristics. The content of ZnO and $B_2O_3$ are essential to the formation of the vitreous matrix as well as providing low glass viscosity for efficient low temperature sealing. Similarly, the PbO content contributes to the glass fluidity, although it is important that the PbO content does not exceed the limits specified because the electrical conductivity and the K tan$\delta$ factor increase to the point of unacceptability. In cases where the K tan$\delta$ factor is too high, the dielectric loss within the glass seal can generate sufficient heat to cause a failure of the seal.

The $SiO_2$ and $Al_2O_3$ content of the sealing glass provide resistance to devitrification and other types of phase separation in addition to providing glass forming oxides. However, when the content of $SiO_2$ or $Al_2O_3$ are substantially in excess of the limits specified, the sealing temperature required to form a seal increases.

Small amounts (e.g. less than about 1 or 2 combined weight percent and preferably less than one half weight percent of alkali oxide can be tolerated so long as these electrical properties are not detrimentally affected. Thus, the term "alkali metal oxide free" as used herein is intended to include such nondetrimental amounts of such alkali metal oxides.

Up to about 5 weight percent of other nonalkali oxides such as $WO_3$, $MoO_3$, $V_2O_5$, $BaO$, $Bi_2O_3$, $CaO$, $MgO$, $TiO_2$, $ZrO_2$, $CdO$, $SnO_2$, and $As_2O_3$ can be included in the sealing glass for property adjustment as long as these oxides are not detrimental to the performance characteristics described above. The terms "consisting essentially of" as used herein includes such nonalkali oxides.

In the past, sealing glass in the lead-zinc-borate compositional field have been studied. For instance, British provisional specification 634,548 discloses sealing glasses containing at least 50 percent PbO for use in joining soda-lime, and lead glasses; U.S. Pat. No. 2,931,142 and 3,127,278 concerns sealing glasses containing in excess of 60 percent PbO; U.S. Pat. No. 3,088,833 and 3,088,835 concern lead, zinc, borosilicate glasses containing specified proportions of copper oxide to solve specific sealing problems; and U.S. Pat. No. 3,088,834 discloses a devitrifiable lead-zinc borosilicate composition. Other patents such as U.S. Pat. Nos. 3,441,422 and 3,752,701 concern the use of zinc borosilicate glasses for encapsulating semiconductor devices. None of these publications disclose a specific family of lead-zinc borates containing specified proportions of alumina and silica to achieve the requisite thermal expansion, resistance to devitrification and other phase separation, and electrical characteristics for use in sealing tubular glass sections for use in underground power transmission applications.

The invention will be described with reference to the drawings wherein

Figure 2:
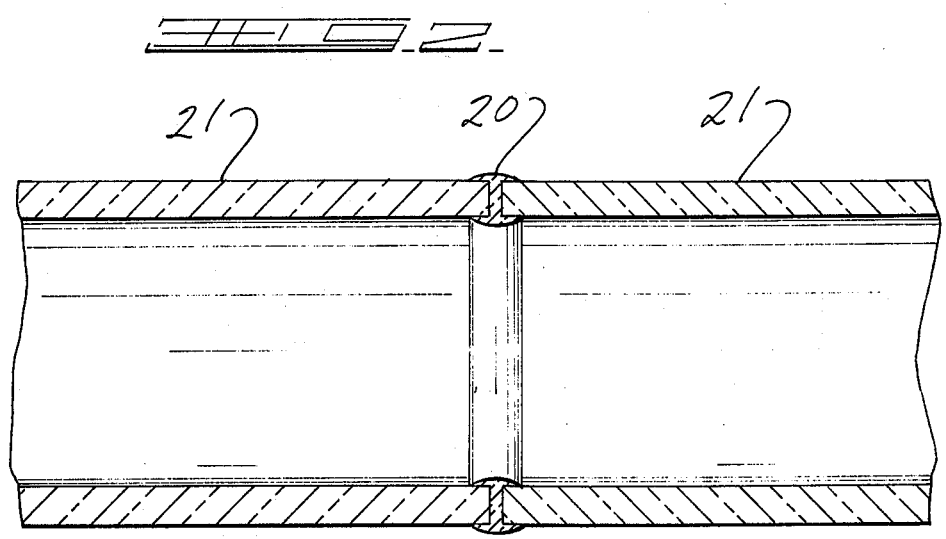

FIG. 1 is a partial sectional view of two glass conduit sections preparatory to sealing, and FIG. 2 illustrates two glass conduit sections sealed together in axial alignment.

In forming such seals, the edges of the glass conduits which are to be sealed together are approximately flat or have opposing surfaces of mating contour. At least one of the edges of the conduits to be joined are coated with this sealing glass composition and juxtapositioned on one another in sealing alignment. The superimposed conduits sections are then subjected to a temperature below that which would impart permanent stress to the glass conduit but still of a degree sufficient to melt and fuse the sealing glass composition to form a seal without devitrifying or otherwise causing phase separation in the sealing glass. Force can be applied to the conduit sections during sealing if desired or required, and can be applied either hydraulically or mechanically. Such techniques of forming the seal are known in the art as in U.S. Pat. No. 3,127,278 the disclosure of which is incorporated by reference.

The overlap of the physical properties of the sealing glass and the glass conduit, as to fusion characteristics, should be such that the sealing glass can perform its sealing function with a minimum disturbance of the shape or stress pattern of the glass article beyond tolerable limits. ("Properties of Glass," by G. Morey, 2nd ed., pages 164–167.) Due to the radical difference in the contraction rate above and below the transformation range of glass (Morey, 2nd ed., Properties of Glass, page 267) and due to the radical difference in the transformation range as between the sealing glass and the prefabricated glass conduit, it is necessary for the sealing glass to have a thermal expansion coefficient somewhat below that of the glass conduit, otherwise an extremely detrimental strain will be set up at the sealing area. It has been found that the thermal expansion coefficients of the sealing glass should preferably be about 1 to $15 \times 10^{-7}$ (0°–300°C)/°C below that of the glass conduits to be joined.

The described sealing glass of the invention can be applied to the juncture edges of the preformed glass conduit in various manners for the purpose of joining such conduits. Preferably, the sealing composition is melted in a container and brought to a temperature corresponding to log 2 viscosity. The glass conduit section which has been preheated to a point below that at which distortion will occur is dipped into the molten sealing glass to the depth desired in the particular seal to be accomplished. This can be accomplished either by preheating the glass conduit or dipping the conduit while it is still hot from the molding or fabricating operation. The sealing glass is allowed to cool and form a bead on edge of the conduit for subsequent reheating and seal fusion in the field. This is shown in FIG. 1 where the glass conduits 10 are provided with a bead of sealing glass 11. Bead 11 is relatively small (e.g. about 1 to 3 mm in thickness). The glass conduits 10 are shown as being axial alignment and ready for joining and fusion. At least one of the ends of the tubular glass section has the bead thereon for efficient fusion and sealing at the point of installation. Preferably, each end has a bead as shown in the drawing.

The glass conduits 10 are then juxtaposed one upon the other with the coated mating edges brought into physical contact and then are subjected to a temperature within the range of from approximately 650° to 800°C for 5 minutes to 2 hours with the preferred time period being about 15 minutes to about 1 hour for efficiency in preventing devitrification.

Such heating can be accomplished in an oven or an annealing lehr (not shown) or by the direct application of combustion heat or electrical or microwave energy in any one of several manners. When the glass parts are sealed together, the drop in temperature from the sealing temperature down to ambient temperature can be controlled so as to achieve annealing.

Referring now to FIG. 2, the quantity of the sealing 20 required to seal the two conduit sections 21 together is relatively small and the greatest thickness thereof remaining in any seal is that where small irregularities may exist between the two surface areas being joined. In the majority of instances the thickness of the sealing composition 20 between the two glass members is relatively thin. (e.g. on the order of a few mm.)

Several other methods of applying the sealing glass to the sealing edges of the prefabricated glass conduit can also be utilized, as, for instance, the sealing glass can be milled to a fine powder and joined with a carrier such as water, glyptol, or any other liquid carrier or agent in the form of a paste which when subjected to heat is not prone to leave foreign or carbonaceous deposits in the seal. Such carriers can be used with the milled or powdered composition to form a paste which can be added to one or both of the edges to be sealed either by brushing, extrusion or any other such application as is conducive to the handling of a paste-like composition. Other methods of applying the composition are also contemplated, such as flowing, spraying or by a coated roller application. It is also contemplated that the heated glass conduit sections to be joined can also be dipped into the powdered composition and thereby dispersed along the seal edge of the member so dipped.

The vitreous sealing glasses can be applied by both the hot and cold sealing techniques. When the cold procedure is employed, the sealing glass composition is ground and mixed with a suitable vehicle to form a paste. One acceptable vehicle is composed of about 1 to 3 percent, usually about 1 to 2 percent nitrocellulose in amyl acetate. Other acceptable organic binders or vehicles can be employed provided they will readily burn off and volatize during the heating procedure in the thermal sealing of the preformed parts. In addition, the selected organic binder should not react with any of the elements making up the bonded assembly. Among examples of other organic binders which can be used are those which include gelatin dissolved in water, nitrocelulose and butyl acetate, camphor with cellulose, and the like.

The vitreous sealing glass composition, mixed with the vehicle, can be manually applied by using a spatula, or a toothpaste-like mixture of sealing glass and carrier can be applied as a uniform layer along at least one of the edges to be sealed by an extrusion procedure.

After coating at least one of the surfaces to be sealed with vitreous sealing glasses of the invention and employing any of the sealing techniques discussed supra, the coated parts can be dried in an oven or by any suitable heating procedure. Next, the dry assembled parts are intimately bonded in an oven or by any suitable heat procedure and finally cooled to room temperature.

The specific advantages of the present invention will be illustrated in the examples that follow wherein all parts are parts by weight, all percentages are weight percentages and all temperatures are in °C unless stated otherwise.

EXAMPLE 1

Part A - Sealing Glass Preparation

High purity conventional glassmaking materials comprising:

| Parts by Weight | Component |
|---|---|
| 3664 | powdered quartz |
| 1876 | alumina |
| 12785 | anhydrous boric acid |
| 26299 | zinc oxide |
| 5454 | lead oxide | are melted at 1200°C for 3 hours in a refractory vessel in an electric furnace with continuous mechanical stirring to achieve a homogeneous, seed-free, clear molten glass having the following compositions in weight percent by chemical analysis:

| | |
|---|---|
| $SiO_2$ | 7.6 |
| $Al_2O_3$ | 3.9 |
| $B_2O_3$ | 25.0 |
| ZnO | 52.5 |
| PbO | 11.0 |

The glass is cooled to room temperature and the electric and physical properties are determined as a function of temperature by conventional testing methods.

| Temperature (°C) | Dielectric Constant (K) | Dissipation Factor($\tan\delta$) $\times 10^3$ | K $\tan\delta$ | AC Resistivity(ohm-cm) $\times 10^{12}$ |
|---|---|---|---|---|
| 50 | 8.35 | 0.94 | 0.0078 | 4.5 |
| 100 | 8.46 | 1.40 | 0.0118 | 2.9 |
| 150 | 8.63 | 1.90 | 0.0164 | 2.1 |
| 200 | 8.84 | 2.80 | 0.0247 | 1.2 |

Coefficient of thermal expansion = $47 \times 10^{-7}$ (0°–300°C)/°C

Annealing Point temperature = 525°C

Fiber Softening Point temperature = 600°C

Devitrification Resistance test -

Heat treatments at which Devitrification Initiates

770°C for 15 minutes

740°C for 30 minutes

710°C for 60 minutes

The above devitrification tests provide a general indication of the heat treatment that can be employed in firing the sealing glass. The heat treatments that cause devitrification are to be avoided and the above test data provides a general indication of the upper time-temperature limits.

Part B - Formation of a Glass Seal

The sealing edge of a tubular glass pipe as preparing in Example 1 of application Ser. No. 415,739 filed 11-14-73 having an inside diameter of 2 inches and an outside diameter of 3 inches, a coefficient of thermal expansion of $52 \times 10^{-7}$ (0°–300°C)/°C and a composition comprising in weight percentage:

| | |
|---|---|
| $SiO_2$ | 46.2 |
| $B_2O_3$ | 14.0 |
| $Al_2O_3$ | 16.4 |
| CaO | 13.5 |
| MgO | 10.1 | is dipped in a reservoir of the molten sealing glass of Part A. The pipe is then removed and the adhering bead of sealing glass is cooled to the room temperature to form the structure as illustrated in FIG. 1. The bead is about 1 millimeter in thickness. Another section of the same glass pipe is dipped in the molten sealing glass and removed therefrom and allowed to cool to form a second structure as shown in FIG. 1.

The two glass pipe sections thus prepared are brought together in axial alignment and fired at 700°C for 15 minutes by means of electrical resistance heaters to form a hermetic seal between the two pipe sections as illustrated in FIG. 2. The procedure of dipping the glass pipe sections in the molten sealing glass and then sealing them together is repeated several times to form a continuous conduit. This conduit is suitable for use in containing an underground electrical power transmission network of the type described in commonly assigned copending case Ser. No. 415,739 filed 11-14-73. Similar results are obtained when the sealing glass of Part A is applied to the edge of the glass pipe as a paste of a fine sealing glass powder in a vehicle of nitrocellulose in amyl acetate.

EXAMPLES 2 AND 3

Part A

To further illustrate the principles of the present invention, high purity batch materials are melted by the method of Example 1 to yield the sealing glass compositions designated in Table I. The properties of these glasses are evaluated as in Example 1 and are reported in Table I.

Similar results are obtained when these sealing glasses are used for sealing together sections of tubular glass conduits for use in electrical power transmission as in Example 1.

Table I

| Oxide | Composition (in weight %) and Properties for Sealing Glasses | |
|---|---|---|
| | Ex.2 | Ex.3 |
| ZnO | 56.5 | 35.8 |
| $B_2O_3$ | 26.4 | 30.6 |
| PbO | 5.6 | 19.6 |
| $Al_2O_3$ | 3.9 | 5.6 |
| $SiO_2$ | 7.6 | 3.3 |
| $WO_3$ | — | 5.1 |
| Electrical Properties at 200°C | | |
| Dielectric Constant (K) | 8.5 | 9.0 |
| Dissipation Factor $(\tan\delta) \times 10^3$ | 3.4 | 6.1 |
| $K \tan \delta$ | 0.02 | 0.05 |
| AC Resistivity (ohm-cm) $\times 10^{-12}$ | 1.7 | 4.0 |
| Coefficient of Thermal Expansion (0–300°C)/°C $\times 10^7$ | 46 | 51 |

Having thus described the invention, what is claim is:

1. A glass conduit for containing electrical power conductors comprising a plurality of tubular glass sections, having a composition consisting essentially of the following components in weight percentages:

| | |
|---|---|
| $SiO_2$ | 28–60 |
| $B_2O_3$ | 5–25 |
| $Al_2O_3$ | 13–35 |
| CaO | 0–30 |
| MgO | 0–30 |
| Wherein: | |
| CaO+MgO | 10–30 |
| $SiO_2+B_2O_3$ ≤ | 75 |
| $SiO_2+Al_2O_3$ ≤ | 75 |
| $Al_2O_3+CaO+MgO$ ≤ | 60 | said sections being hermetically joined together in axial alignment with a totally seal of fused glass having an alkali metal oxide free composition consisting essentially of the following components in the following weight percentages:

| | |
|---|---|
| ZnO | 35–60 |
| $B_2O_3$ | 20–35 |
| PbO | 5–20 |
| $Al_2O_3$ | 1–10 |
| $SiO_2$ | 1–10 | said sealing glass having the following electrical properties at 150°C, a log AC resistivity (ohm-cm) ≥ 10 of a dielectric constant (K) of ≤ 10 and a $K \tan\delta$ ≤ 0.1.

2. The conduit of claim 1 wherein said fused glass consists essentially of the following components in the following weight percentages:

| | |
|---|---|
| ZnO | 45–57 |
| $B_2O_3$ | 25–35 |
| PbO | 5–15 |
| $Al_2O_3$ | 3–6 |
| $SiO_2$ | 3–8 |

3. The glass conduit of claim 1 wherein said tubular glass sections have a composition consisting essentially of the following components in weight percent:

| | |
|---|---|
| $SiO_2$ | 30–60 |
| $B_2O_3$ | 5–24 |
| $Al_2O_3$ | 14–25 |
| CaO | 5–20 |
| MgO | 5–20 |
| Wherein: | |
| CaO+MgO | 11–28 |
| $SiO_2+B_2O_3$ ≤ | 70 |
| $SiO_2+Al_2O_3$ ≤ | 70 |
| $Al_2O_3+CaO+MgO$ ≤ | 55 |

4. The glass conduit of claim 1 wherein said tubular glass sections have a composition consisting essentially of the following components in weight percentages:

| | |
|---|---|
| $SiO_2$ | 35–60 |
| $B_2O_3$ | 5–23 |
| $Al_2O_3$ | 14–22 |
| CaO | 5–20 |
| MgO | 5–20 |
| Wherein: | |
| CaO+MgO | 15–25 |
| $SiO_2+B_2O_3$ ≤ | 65 |
| $SiO_2+Al_2O_3$ ≤ | 65 |
| $Al_2O_3+CaO+MgO$ ≤ | 45 |

5. A composite glass article for use in forming a glass conduit for containing electrical power conductors, said article comprising a tubular glass section, having a composition consisting essentially of the following components in weight percentages:

| | |
|---|---|
| $SiO_2$ | 28–60 |
| $B_2O_3$ | 5–25 |
| $Al_2O_3$ | 13–35 |
| CaO | 0–30 |
| MgO | 0–30 |

Wherein:

| | |
|---|---|
| CaO+MgO | 10–30 |
| $SiO_2+B_2O_3$ ≤ | 75 |
| $SiO_2+Al_2O_3$ ≤ | 11 75 |
| $Al_2O_3+CaO+MgO$ ≤ | 60 | at least one end of said glass section having thereon a fused totally vitreous glass bead of sealing glass having an alkali metal oxide free composition consisting essentially of the following components in the following weight percentages:

| | |
|---|---|
| ZnO | 35–60 |
| $B_2O_3$ | 20–35 |
| PbO | 5–20 |
| $Al_2O_3$ | 1–10 |
| $SiO_2$ | 1–10 | said sealing glass having the following electrical properties at 150°C, a log AC resistivity (ohm-cm) ≥ 10, a dielectric constant (K) ≤ 10 and a $K \tan\delta$ ≤ 0.1.

6. The composite glass article of claim 5 wherein said bead of sealing glass consists essentially of the following components in weight percentage:

| | |
|---|---|
| ZnO | 45–57 |
| $B_2O_3$ | 25–35 |
| PbO | 5–15 |
| $Al_2O_3$ | 3–6 |
| $SiO_2$ | 3–8 |

7. The composite glass article of claim 6 wherein said tubular glass section has a composition consisting essentially of the following components in the following weight percentages:

| | |
|---|---|
| $SiO_2$ | 30–60 |
| $B_2O_3$ | 5–24 |
| $Al_2O_3$ | 14–25 |
| CaO | 5–20 |
| MgO | 5–20 |
| Wherein: | |
| CaO+MgO | 11–28 |
| $SiO_2+B_2O_3$ | $\leq$ 75 |
| $SiO_2+Al_2O_3$ | $\leq$ 75 |
| $Al_2O_3+CaO+MgO$ | $\leq$ 60 |

8. The composition glass article of claim 6 wherein said tubular glass section has a composition consisting essentially of the following components in the following weight percentages:

| | |
|---|---|
| $SiO_2$ | 35–60 |
| $B_2O_3$ | 5–23 |
| $Al_2O_3$ | 14–22 |
| CaO | 5–20 |
| MgO | 5–20 |
| Wherein: | |
| CaO+MgO | 15–25 |
| $SiO_2+B_2O_3$ | $\leq$ 65 |
| $SiO_2+Al_2O_3$ | $\leq$ 65 |
| $Al_2O_3+CaO+MgO$ | $\leq$ 45 |

* * * * *